United States Patent
Derevyagin et al.

(10) Patent No.: US 7,571,656 B2
(45) Date of Patent: Aug. 11, 2009

(54) METHOD FOR ULTRASONIC MEASUREMENT OF THE FLOW OF LIQUID AND/OR GASEOUS MEDIA AND AN APPARATUS FOR IMPLEMENTING THEREOF

(75) Inventors: Alexandr Mikhailovich Derevyagin, PER. Sivtsev Vrazhek, 44-23, Moscow, 119002 (RU); Alexandr Sergeevich Fomin, St. Petersburg (RU); Vladimir Ivanovich Svistun, Moscow (RU)

(73) Assignee: Alexandr Mikhailovich Derevyagin, Moscow (RU)

( * ) Notice: Subject to any disclaimer, the term of this patent is extended or adjusted under 35 U.S.C. 154(b) by 654 days.

(21) Appl. No.: 10/584,896

(22) PCT Filed: Mar. 3, 2005

(86) PCT No.: PCT/RU2005/000091
§ 371 (c)(1),
(2), (4) Date: Jun. 28, 2006

(87) PCT Pub. No.: WO2005/098374
PCT Pub. Date: Oct. 20, 2005

(65) Prior Publication Data
US 2009/0151471 A1  Jun. 18, 2009

(30) Foreign Application Priority Data
Apr. 12, 2004  (RU) ............... 2004110782

(51) Int. Cl.
*G01F 1/66* (2006.01)
(52) U.S. Cl. .................................. 73/861.27
(58) Field of Classification Search ............ 73/861.355, 73/861.356, 861.357, 861.27
See application file for complete search history.

(56) References Cited

U.S. PATENT DOCUMENTS

| 3,554,186 A | * | 1/1971 | Leksell et al. ............... 600/451 |
| 4,106,492 A | * | 8/1978 | Schuette et al. ............. 600/446 |
| 4,281,549 A | * | 8/1981 | Kretz .......................... 73/626 |
| 5,987,983 A | * | 11/1999 | Ariav et al. .................. 73/488 |

* cited by examiner

*Primary Examiner*—Jewel Thompson
(74) *Attorney, Agent, or Firm*—Ladas and Parry LLP

(57) ABSTRACT

The invention relates to measuring technique.

For increasing an accuracy of measurement of the flow of liquid and/or gaseous medium a method for ultrasonic measurement of the flow of liquid and/or gaseous media comprises radiating ultrasonic oscillations downstream or upstream relative to the flow of the medium to be measured, receiving oscillations passed through the medium with conversion into electrical signals, and radiating ultrasonic oscillations upstream or downstream of the medium to be measured, receiving oscillations passed through the medium with subsequent conversion into electrical signals, analyzing said electrical signals to determine difference in time for passage of ultrasonic oscillations downstream and upstream for calculation of the flow of the medium, wherein at least two reversible electroacoustic transducers are used, each of them having a directional diagram with a beam angle of not less than 60° in different cross section planes and being positioned on a measuring section of a pipeline in such a manner that the axis of the directional diagram is mainly perpendicular to the longitudinal axis of the pipeline.

5 Claims, 1 Drawing Sheet

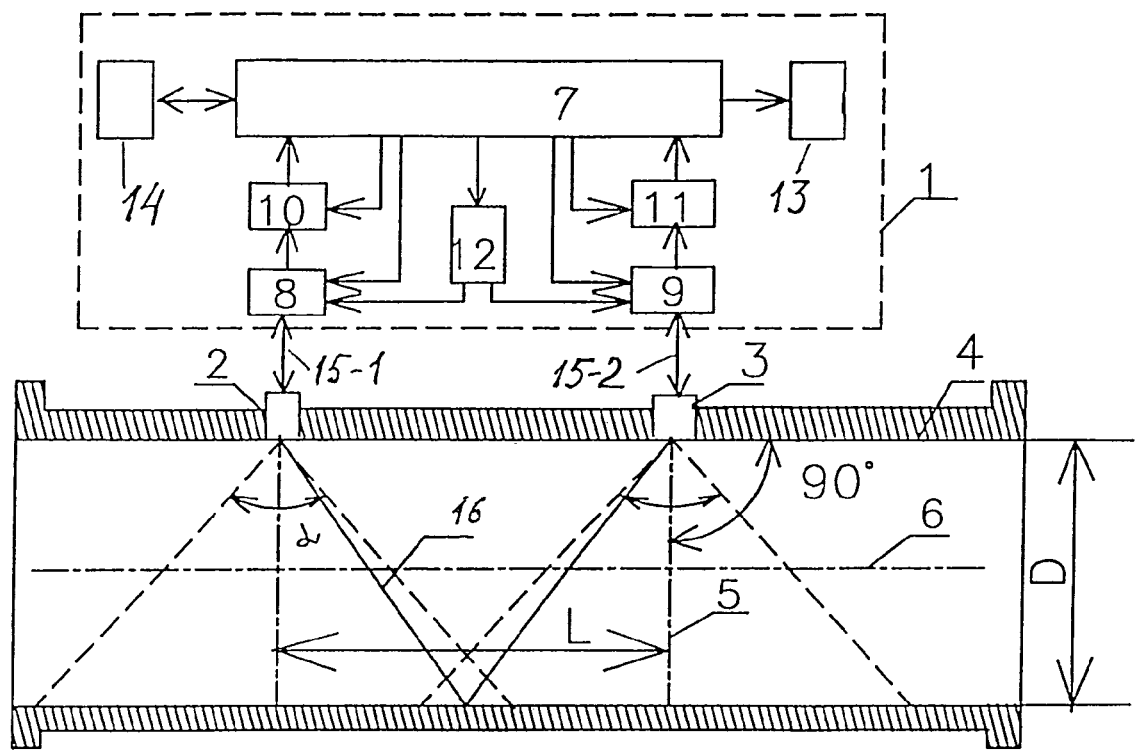
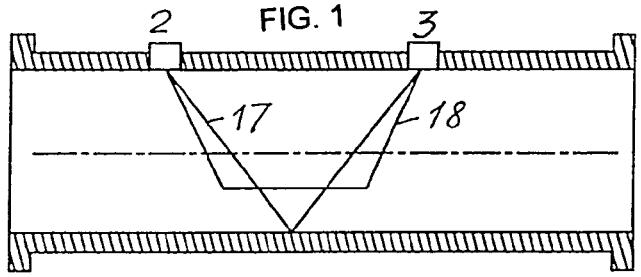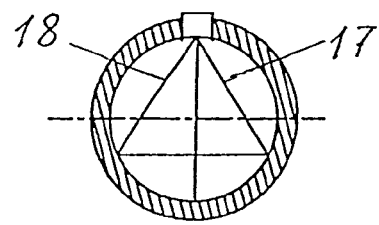
FIG. 2
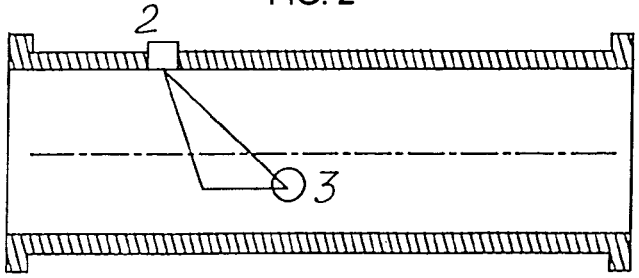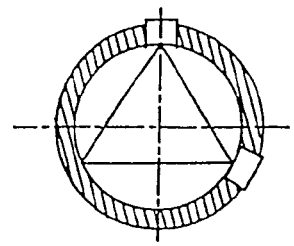
FIG. 3
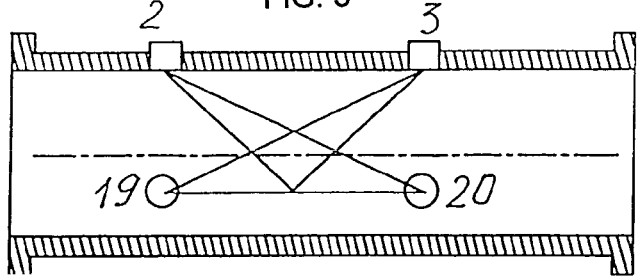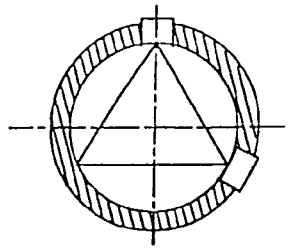
FIG. 4

US 7,571,656 B2

METHOD FOR ULTRASONIC MEASUREMENT OF THE FLOW OF LIQUID AND/OR GASEOUS MEDIA AND AN APPARATUS FOR IMPLEMENTING THEREOF

FIELD OF THE INVENTION

The present invention relates to measuring technique, in particular, to methods for ultrasonic measurement of the flow of liquid and/or gaseous media and to apparatuses for implementing thereof.

BACKGROUND OF THE INVENTION

It is known a method for ultrasonic measurement of flow velocity based on simultaneous operation of two sync rings in one electroacoustical channel one of which operates downstream, the other—upstream the flow (see USSR Author Certificate No 802709, Int. Cl. G01F1/66, 1981).

The known method does not provide, however, a sufficient accuracy of measurement of the flow velocity on base of which it is possible to appreciate the flow of liquid and/or gaseous medium.

In respect of a technical essence the closest prior art to the proposed method is an ultrasonic frequency-pulse method for measurement of the flow consisting in formation in one measuring channel of two sync rings switching in a radiation of ultrasonic oscillations downstream relative to the flow of the medium to be measured downstream and upstream thereof, reception of the oscillations passed through the medium and conversion of them into an electrical signal, herewith electrical signals in each sinc ring are transmitted via a communications line, measurement of frequency of signals following in each sync ring, and determination of a value of the flow is made according to a difference in measured frequencies (see Russian patent No 2104498, Int. Cl. G01F1/66, of Feb. 16, 1993).

The known method does not provide, however, sufficient accuracy of measurement of medium flow, since the measurement is performed only according to results of analysis of electrical signals converted from ultrasonic oscillations passed directly from one transducer to other one that reduces functionality of the method and does not provide determination of the flow velocity in different points of a pipe cross section.

It is known an ultrasonic frequency-pulse flowmeter comprising a flow transducer made in form of two electroacoustic transducers mounted on a measuring section of a pipeline and coupled with an electronic block via a communications line, as well as asynchronous switches mounted in parallel to input and output of a communications line (see Russian patent No 2104498, Int. Cl. G01F1/66, of Feb. 16, 1993).

The known apparatus does not provide, however, a sufficient accuracy of measurement of the flow of medium since it does not provide for determination of the flow velocity in different points of a pipe cross section.

In respect of the technical essence the closest to the proposed apparatus prior art is an ultrasonic flowmeter comprising first and second piezoelectric emitters mounted on a measuring section of the pipeline at an angle to its axis, a power amplifier being coupled via a first frequency multiplier with a second piezoelectric emitter, a continuous wave oscillator, two filters, a first phase shifter coupled with first input of a phase-meter, a second frequency multiplier coupled with a second input of the phase-meter output of which is coupled with an indicator, first an second piezoelectric receivers, first and second limiting amplifiers, a second phase shifter, a modulator and a square-wave generator (see USSR Author Certificate No 1599659, Int. Cl. G01F1/66, of Aug. 22, 1987).

However, and this known apparatus does not provide high accuracy of the measurement of flow of substance since the measurement is made only on one way of passage of ultrasonic oscillations in a measuring section of a pipeline and is not made on other ways. Therefore is not provided the measurement of orthographic epure of flow velocity along a pipe cross section.

Moreover, in the known technical solutions axes of the directional diagrams of ultrasonic transducers are not perpendicular to the longitudinal axis of pipeline, and external radiating surfaces are not combined with an inner surface of the pipeline.

This results in formation of hollows which distort a profile of the flow and collect pollutions.

DISCLOSURE OF THE INVENTION

The basis of the invention is a task of increasing reliability and an accuracy of measurement of the flow of liquid and/or gaseous medium owing to decreasing distortions of the profile of liquid and/or gaseous medium and to eliminating pollutions.

This task is solved by the fact that in accordance with the first invention a method for ultrasonic measurement of the flow of liquid and/or gaseous media comprises radiating ultrasonic oscillations downstream or upstream relative to the flow of the medium to be measured, receiving oscillations passed through the medium with conversion into electrical signals, and radiating ultrasonic oscillations upstream or downstream of the medium to be measured, receiving oscillations passed through the medium with subsequent conversion into electrical signals, analyzing said electrical signals to determine difference in time for passage of ultrasonic oscillations downstream and upstream for calculation of the flow of the medium, wherein at least two reversible electroacoustic transducers are used, each of them having a directional diagram with a beam angle of not less than 60° in different cross section planes and being positioned on a measuring section of a pipeline in such a manner that the axis of the directional diagram is mainly perpendicular to the longitudinal axis of the pipeline, the first reversible electroacoustic transducer is displaced relative to the second downstream at a distance of not more than 2.5 D, where D is the diameter of the pipeline, wherein said analysis is carried out in respect to electrical signals converted from ultrasonic oscillations passed directly from a transducer to a transducer and/or electrical signals converted from ultrasonic oscillations passed through single and/or multiple reflection from an inner surface of the pipeline.

In accordance with the second invention an ultrasonic flowmeter comprises a block for forming and analyzing electrical pulses, which is electrically coupled to at least two reversible electroacoustic transducers, each of which having a directional diagram for radiation and reception with a beam angle of not less than 60° in cross section planes and being positioned on a measuring section of a pipeline in such a manner that the axis of the directional diagram is mainly perpendicular to the longitudinal axis of the pipeline, the first reversible electroacoustic transducer is displaced relative to the second downstream at a distance of not more than 2.5 D, where D is the diameter of the pipeline, wherein an external radiating surface of each reversible electroacoustic transducer is mainly combined with an inner surface of the pipeline, besides the first and the second reversible electroacoustic transducers are positioned on one generatrix of the pipeline with provision for the passage of a pulse of ultrasonic oscillations from one to the other after n-fold reflection, wherein n is an integer, up to 20, from the inner surface of the pipeline, the first and the second reversible electroacoustic transducers are positioned on different generatrices of the pipeline with provision for the passage of a pulse of ultrasonic oscillations from one to the other directly and/or after m-fold reflection, wherein m is an integer up to 20, from the inner surface of the pipeline, besides the block for forming and analyzing electrical pulses comprises a controller electrically coupled to at least two channel transceivers, two ADCs, a pulse generator, an indicator and an interface block, herewith the pulse generator is electrically coupled to channel transceivers, each of which is mutually linked to a corresponding ADC and to a corresponding electrical coupling input-output of the block for forming and analyzing electrical pulses with a reversible electroacoustic transducer.

The essence of the invention is that an implementation of the proposed apparatus in the above manner allows realizing a necessary sequence of operations due to which one is provided a measurement of the epure of flow velocities along the pipe cross section that significantly increases the accuracy of measurement.

Besides, a combination of the external radiating surface of each reversible electroacoustic transducer with the inner surface of the pipeline eliminates formation of the hollows ("pockets"), distortions of the profile of the flow and pollutions.

BRIEF DESCRIPTION OF THE DRAWINGS

FIG. 1 illustrates a structure of the proposed apparatus and its functional block diagram, FIG. 2-4 illustrate variants of positioning electroacoustic transducers.

BEST VARIANT OF EMBODIMENT OF THE INVENTIONS

A method for ultrasonic measurement of the flow of liquid and/or gaseous media comprises radiating ultrasonic oscillations downstream or upstream relative to the flow of the medium to be measured, receiving oscillations passed through the medium with conversion into electrical signals and storing them, and radiating ultrasonic oscillations upstream or downstream of the medium to be measured, receiving oscillations passed through the medium with subsequent conversion into electrical signals and storing them, as well as analyzing said electrical signals to determine difference in time for passage of ultrasonic oscillations downstream and upstream for calculation of the flow of the medium.

It should be noted that herewith at least two reversible electroacoustic transducers are used, each of them having a directional diagram with a beam angle of not less than 60° in different cross section planes and being positioned on a measuring section of a pipeline in such a manner that the axis of the directional diagram is mainly perpendicular to the longitudinal axis of the pipeline, the first reversible electroacoustic transducer is displaced relative to the second downstream at a distance of not more than 2.5 D, where D is the diameter of the pipeline.

Herewith said analysis is carried out in respect to electrical signals converted from ultrasonic oscillations passed directly from a transducer to a transducer and/or electrical signals—from ultrasonic oscillations passed through single and/or multiple reflection from an inner surface of the pipeline.

The ultrasonic flowmeter comprises a block 1 for forming and analyzing electrical pulses which is electrically coupled to at least two reversible electroacoustic transducers 2 and 3 each of which having a directional diagram for radiation and reception with the beam angle of not less than 60° in different cross section planes and being positioned on a measuring section 4 of a pipeline in such a manner that the axis 5 of the directional diagram is mainly perpendicular to the longitudinal axis 6 of the pipeline.

The first reversible electroacoustic transducer 2 is displaced relative to the second 3 downstream at a distance of not more than 2.5 D, where D is the diameter of the pipeline, and each of them is electrically coupled to the block 1 for forming and analyzing electrical pulses.

An external radiating surface of each reversible electroacoustic transducer 2 and 3 is mainly combined with an inner surface of the pipeline.

The first and the second reversible electroacoustic transducers 2 and 3 may be positioned on one generatrix of the pipeline with provision for the passage of a pulse of ultrasonic oscillations from one to the other after n-fold reflection, wherein n is an integer up to 20, from the inner surface of the pipeline.

Besides, the first and the second reversible electroacoustic transducers 2 and 3 may be positioned on different generatrices of the pipeline with provision for the passage of a pulse of ultrasonic oscillations from one to the other (directly or after m-fold reflection, wherein m is an integer up to 20, front the inner surface of the pipeline.

The block 1 for forming and analyzing electrical pulses comprises a controller 7 electrically coupled to at least two channel transceivers 8 and 9, two ADSs 10 and 11, a pulse generator 12, and indicator 13 and an interface block 14.

As a controller 7 may be used the standard digital signal processor of the firm "Motorola" of DSP56309-type. The channel transceivers 8 and 9 are designed for receiving and amplifying electrical signals from a generator 13 and reversible electroacoustic transducers 2 and 3. As an interface block 14 may be used the integrated circuit MAX 1480 of the firm "Maxim".

The pulse generator 12 is electrically coupled to channel transceivers 8 and 9 each of which is mutually linked to a corresponding, ADC and to a corresponding electrical coupling input-output 15-1 and 15-2 of the block 1 for forming and analyzing electrical pulses with corresponding reversible electroacoustic transducers 2 and 3.

The apparatus comprises a power block (is absent in FIG. 1) which may be positioned as in the block 1 for forming and analyzing electrical pulses and outside of it.

As reversible electroacoustic transducers may be used the transducers of MA40 series of the Japan firm "Murata".

The apparatus operates in the following manner.

In accordance with a program written in ROM of the controller 7 is driven the generator 12, from one of outputs of which come rectangle pulses to input of the channel transceiver 8 from output of which the amplified electrical signal comes to the reversible electroacoustic transducer 2. The last radiates ultrasonic oscillations having a directional diagram with a beam angle of not less 60° in different cross section planes.

It should be noted that of the entire beam of ultrasonic oscillations of the transducer 2(3) having, a directional diagram beam angle $\alpha \geqq 60°$ in different cross section planes are used only the beams which fall into the transducer 2(3) directly or after "n" or "m"-fold reflection from the inner surface. The ultrasonic signal which passed downstream the flow of the medium to be measured with one-fold reflection of the beam 16 comes to the transducer 3 from output of which the electrical signal comes to the channel transceiver 9 which amplifies this signal and transmits it to ADC 11. From output of ADC 11 a digitized signal comes to the controller 9 and is stored in its random access memory. Analogously after coming pulses from the generator 12 to the second channel transceiver 9 and from its output to the reversible electroacoustic transducer 3 takes place the radiation of ultrasonic oscillations upstream the flow of medium to be measured and their coming along a return way of the beam 16 to the electroacoustic transducer 2.

From output of the last electrical signals come via input-output 15-1 and the channel transceiver 8 to ADC 10 and further come into RAM of the controller 7. In the controller 7 takes place analysis of received electrical signals for determining difference in time for passage of ultrasonic oscillations downstream and upstream. According to this difference is calculated the flow of liquid and/or gaseous media. On the indicator 13 are displayed the result of the measurement of the flow of medium as well as different technological parameters. The interface block 14 serves for transmitting data from the flowmeter to external network.

In the proposed flowmeter radiating and receiving surfaces of the ultrasonic transducers 2 and 3 are maximum combined with the inner surface of the measuring section 4 of the pipeline and are positioned in parallel to the axis 6 of the pipeline that eliminates formation of the hollows ("pockets") and distortions of the profile of the flow.

The proposed structure has also another advantage: from one beam of an ultrasonic pulse are discriminated n-beams which pass n-ways with different time delays relative to a sent signal, herewith are realized n measurement channels that allows to realize more accurate measurement of the flow. In the flowmeter with two transducers 2 and 3 mounted on one generatrix of the pipeline at a distance from each other, for example, 1.4 D, where D is the diameter of pipeline, the beam 17 will be the first which will come along the shortest way and which being reflected from an opposite wall of the pipeline, two beams will be the second ones which will come and which have passed along three chords with double reflection from the wall of the pipeline, herewith one of them will come clockwise, the second will come counter-clockwise. The controller 7 according to a shift in time between them calculates lateral components of the flow. The fourth and fifth beams will be the beams which will come and which have passed four-fold reflection from walls of the pipeline etc. The beam angle being equal to and more than 60° is selected to provide the passage of beams 17 and 18 from the transducer 2 (3) to the transducer 3 (2) along chords with double and more-fold reflection.

With help of the controller 7 is calculated the velocity in different cross sections of the pipeline, is determined the epure of the flow, is taken into account a degree of flow swirling, and is determined the flow of medium with a minimum error.

In case of mounting four ultrasonic transducers 2, 3, 19, 20 (FIG. 4) increases the number of measuring channels. Selection of location of mutual positioning of ultrasonic transducers is determined by an experiment and depends on peculiarities of the flow of the medium to be measured.

INDUSTRIAL APPLICABILITY

The described advantages of proposed technical solutions allow them the possibility of wide commercial usage in the field of measuring technique for measuring the flow of liquid and/or gaseous media and may be used when developing ultrasonic flowmeters of different types.

The invention claimed is:

1. A method for ultrasonic measurement of the flow of liquid and/or gaseous media, characterized in that it comprises radiating ultrasonic oscillations downstream or upstream relative to the flow of the medium to be measured, receiving oscillations passed through the medium with conversion into electrical signals, and radiating ultrasonic oscillations upstream or downstream of the measured medium, receiving oscillations passed through the medium with subsequent conversion into electrical signals, analyzing said electrical signals to determine difference in time for passage of ultrasonic oscillations downstream and upstream for calculation of the flow of the medium, wherein at least two reversible electroacoustic transducers are used, each of them having a directional diagram with a beam angle of not less than 60° in different cross section planes and being positioned on a measuring section of a pipeline in such a manner that the axis of the directional diagram is mainly perpendicular to the longitudinal axis of the pipeline, the first reversible electroacoustic transducer is displaced relative to the second downstream at a distance of not more than 2.5 D, where D is the diameter of the pipeline, wherein said analysis is carried out in respect to electrical signals converted from ultrasonic oscillations passed directly from a transducer to a transducer and/or electrical signals converted from ultrasonic oscillations passed through single and/or multiple reflection from an inner surface of the pipeline.

2. An ultrasonic flowmeter, characterized in that it comprises a block for forming and analyzing electrical pulses, which is electrically coupled to at least two reversible electroacoustic transducers, each of which having a directional diagram for radiation and reception with a beam angle of not less than 60° in cross section planes and being positioned on a measuring section of a pipeline in such a manner that the axis of the directional diagram is mainly perpendicular to the longitudinal axis of the pipeline, the first reversible electroacoustic transducer is displaced relative to the second downstream at a distance of not more than 2.5 D, where D is the diameter of the pipeline, wherein an external radiating surface of each reversible electroacoustic transducer is mainly combined with an inner surface of the pipeline.

3. The ultrasonic flowmeter according to claim 2, characterized in that the first and second reversible electroacoustic transducers are positioned on one generatrix of the pipeline with provision for the passage of a pulse of ultrasonic oscillations from one to the other after n-fold reflection, wherein n is an integer up to 20, from the inner surface of the pipeline.

4. The ultrasonic flowmeter according to claim 2, characterized in that the first and second reversible electroacoustic transducers are positioned on different generatrices of the pipeline with provision for the passage of a pulse of ultrasonic oscillations from one to the other directly and/or after in-fold reflection, wherein m is an integer up to 20, from the inner surface of the pipeline.

5. The ultrasonic flowmeter according to claim 2, characterized in that the block for forming and analyzing electrical pulses comprises a controller electrically coupled to at least two channel transceivers, two ADCs, a pulse generator, an indicator and an interface block, wherein the pulse generator is electrically coupled to channel transceivers, each of which is mutually linked to a corresponding ADC and to a corresponding electrical coupling input-output of the block for forming and analyzing electrical pulses with a reversible electroacoustic transducer.

* * * * *